United States Patent [19]

Eige et al.

[11] 4,125,881
[45] Nov. 14, 1978

[54] TAPE MOTION CONTROL FOR REEL-TO-REEL DRIVE

[75] Inventors: John J. Eige; Arvind M. Patel; Spencer D. Roberts, all of San Jose; David Stedman, Morgan Hill, all of Calif.

[73] Assignee: International Business Machines Corporation, Armonk, N.Y.

[21] Appl. No.: 798,539

[22] Filed: May 19, 1977

[51] Int. Cl.² .......................... G11B 5/09; G03B 1/04
[52] U.S. Cl. ..................................... 360/50; 242/186; 318/7
[58] Field of Search ....................... 242/189, 190, 186; 318/6, 7, 163; 360/50

[56] References Cited

U.S. PATENT DOCUMENTS

| | | | |
|---|---|---|---|
| 3,648,134 | 3/1972 | Audeh et al. | 318/6 |
| 3,713,606 | 1/1973 | Van Pelt | 242/186 |
| 3,746,278 | 7/1973 | Dennis | 242/190 |
| 3,764,087 | 10/1973 | Paananen et al. | 242/186 |
| 3,910,527 | 10/1975 | Buhler et al. | 242/186 |
| 3,984,065 | 10/1976 | Bosetti et al. | 318/7 |
| 3,984,868 | 10/1976 | Ragle et al. | 360/73 |
| 4,015,799 | 4/1977 | Koski et al. | 242/203 |

Primary Examiner—Vincent P. Canney
Attorney, Agent, or Firm—H. E. Otto, Jr.

[57] ABSTRACT

High tape acceleration rates are achieved in an unbuffered, capstanless tape drive system by a tape motion control apparatus employing separate drive motors for each reel of a reel-to-reel tape transport. Tape moves from one reel past a read/write head and a tape tension sensor to the other reel, there being no tachometer in the tape feed path. A tachometer on one reel shaft provides a large number of pulses per revolution which pulses are counted by a counter; and a tachometer on the other reel shaft provides only one pulse per revolution, which pulse gates out the count then accumulated in the counter for actuating means to provide motor acceleration currents of a magnitude corresponding to said accumulated count according to a predetermined servo algorithm for controlling rotation of both reels. A tape radius constant corresponding to the actual length and thickness of tape in the system is calculated during initial wrap of tape onto the takeup reel. Tension is tightly controlled by an analog tension sensor and servo system.

17 Claims, 1 Drawing Figure

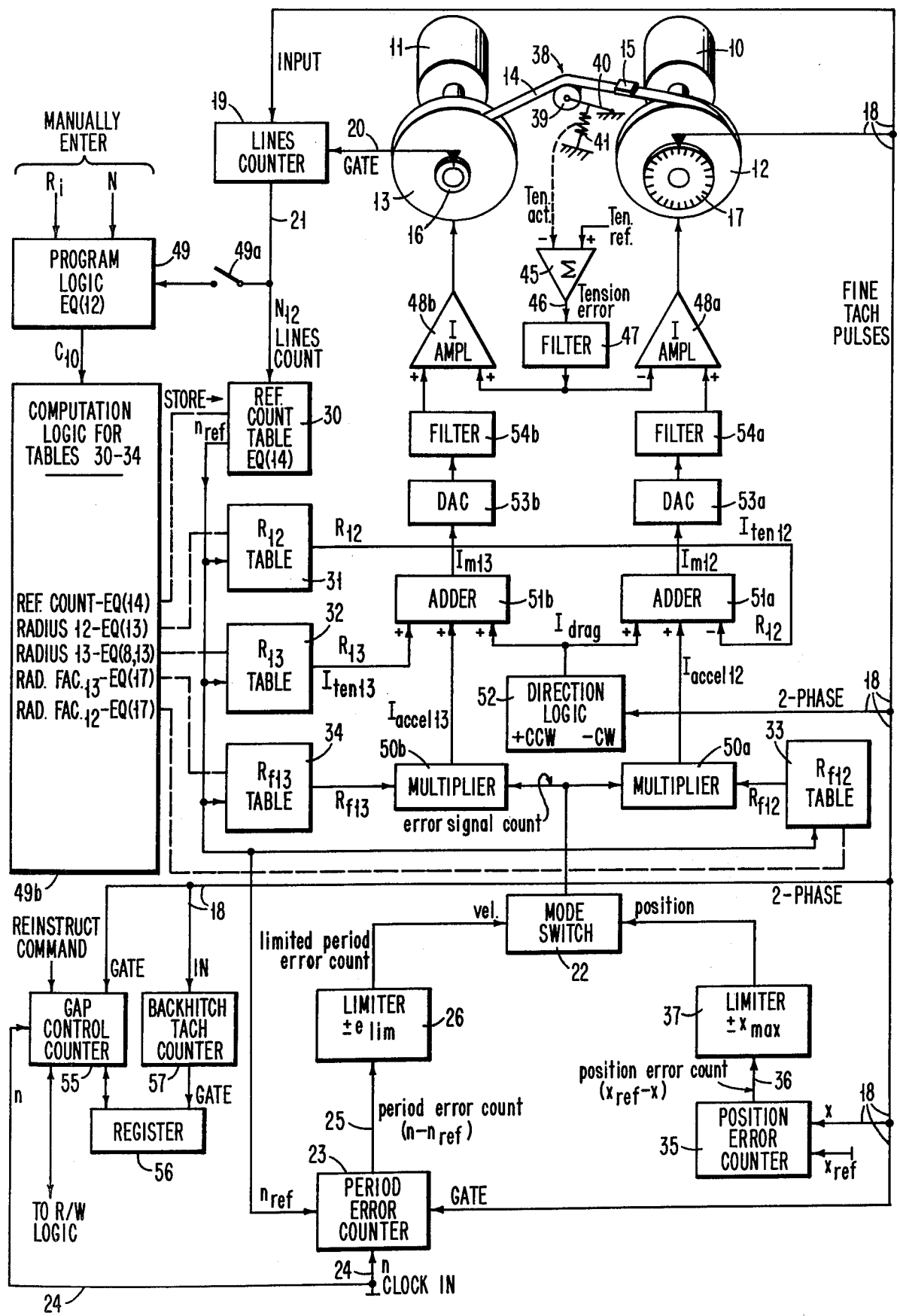

TAPE MOTION CONTROL FOR REEL-TO-REEL DRIVE

RELATED PATENT APPLICATIONS ASSIGNED TO THE SAME ASSIGNEE AS PRESENT INVENTION

Koski, et al, Ser. No. 631,808, filed Nov. 14, 1975 (now U.S. Pat. No. 4,015,799, granted Apr. 5, 1977) entitled "Adaptive Reel-to-Reel Tape Control System."

BACKGROUND OF THE INVENTION

This invention relates to tape motion control apparatus and more particularly to such apparatus for use in moving magnetic tape at high acceleration rates without slippage from one reel to another, and thereafter at constant velocity and with constant tension in an unbuffered reel-to-reel tape transport system.

The referenced related patent application discloses a tape drive apparatus employing a finely graduated tachometer on an idler roll in the tape feed path to measure the amount of tape advanced during a complete revolution of each tape reel shaft in an unbuffered reel-to-reel tape drive system. From the amount of tape advanced between single pulses per revolution of each reel shaft, the radius of such reel was independently derived and continually modified as radius changed during feeding of the tape. From a table storing inertial values corresponding to predetermined values of tape reel radius, the radius values for each reel were repeatedly converted into corresponding inertial values by table lookup. From these inertial values, drive currents for each reel motor were calculated so as to provide a given start and stop tape motion and maintain velocity and tape tension constant during the read/write process and maintain tape from drifting during a stop-lock mode. This arrangement operates very satisfactorily at tape acceleration rates up to 400 inches per second. However, when the acceleration rates are increased tenfold, slippage of the tape can occur at the tachometer in the tape feed path, with resultant loss of precise control of tape tension and velocity.

U.S. Pat. No. 3,764,087 and U.S. Pat. No. 3,984,868 disclose reel-to-reel tape motion control systems which employ separate drive motors for each reel and require no tape buffering or tachometer in the tape feed path. However, the reel motors are selectively driven and a tachometer is associated with only the takeup reel shaft to provide a single pulse per revolution, which pulses are accumulated in a counter as a continuing count indicative of the radius of the tape wrapped around that reel. There is no derivation of the radius of tape wrap on the basis of the amount of tape advanced during rotation of one reel repeatedly during successive complete revolutions of the other reel. As noted in U.S. Pat. No. 3,984,868, inaccuracies in speed control resulting from variations in tape thickness and hub dimensions in the counter embodiment disclosed in U.S. Pat. No. 3,764,087 were eliminated during writing (but not reading) by making use of the spacing between the read and write gaps normally existing in a conventional read/write magnetic head to provide a measurement of actual tape speed during a writing operation. Tape speed measurements are used to produce correction pulses that are applied to the counter for reducing or increasing its count so that the resultant output of a linearity correcting circuit would provide a motor control signal more accurately corresponding to actual tape speed. Note that only one reel is driven at a time, and no means is disclosed or implied to provide tension control or acceleration control.

SUMMARY OF THE INVENTION

The principal object of this invention is to provide an improved tape motion control apparatus for a reel-to-reel tape drive which can accommodate high acceleration rates without tape slippage; can maintain tape tension substantially constant throughout operation; can maintain tape velocity substantially constant between periods of acceleration and deceleration; can maintain tape position when called for; and can control acceleration rate independently of changes in the reel radii.

Another object is to provide such a tape motion control apparatus which is capable of operating satisfactorily even if the amount of tape on the reels is not always of a certain pre-known length and thickness.

In accordance with the invention, there is provided an improved reel-to-reel tape motion control apparatus which requires no tachometer in the tape feed path and employs only two tachometers or other tape motion sensors (one on each reel shaft) from which the radii of both reels can be derived repeatedly for adaptively modifying the drive currents to both reel motors as the radius of each reel and hence its inertia changes. This derivation of radius is achieved by initially calculating a constant corresponding to the actual total length and thickness of tape; then one radius is derived from the reel tachometers and the other radius is derived from said one radius, using said constant.

To maintain actual tape velocity at the read/write head constant, a reference count $n_{ref}$ is repeatedly derived from a read only memory table using the aforementioned constant and the number of tachometer pulses counted on a two-phase fine tachometer on one reel shaft during a single revolution of the other reel shaft. This reference count $n_{ref}$ thus changes adaptively with reel radius change.

Acceleration of the tape past the read/write head is maintained constant at a high rate independently of reel radius. A closed-loop control circuit is superimposed on the open-loop control circuit proposed in the aforementioned related application to maintain tension constant with greater precision, especially during these high acceleration rates.

The foregoing and other objects, features, and advantages of the invention will become apparent from the following more particular description of a preferred embodiment thereof, as illustrated in the accompanying drawings.

BRIEF DESCRIPTION OF THE DRAWING

The single FIGURE is a schematic diagram of a tape motion control apparatus according to the invention, showing a two-phase fine tachometer on one reel shaft for providing a large number of pulses per revolution of the other reel shaft, with both reels being driven by respective motors during tape movement in either direction.

DESCRIPTION OF PREFERRED EMBODIMENT

(a) Theoretical Background

Tangential acceleration, as herein used, connotes acceleration of the tape at the points where it becomes tangent to the reels, and hence the acceleration of that portion of the tape that extends between the two reels;

this acceleration is assumed to be the same at all points between the reels, disregarding the negligible deflection effect of a tension transducer.

In the aforementioned related patent application, the following relationship is derived and there and below is designated as Equation (1):

$$I_m = \frac{\ddot{x}}{K_T}(C_1 \frac{R^4 - C_2}{R} + \frac{J_o}{R}) + \frac{F_{ten}R}{K_T} + \frac{T_{visc} + T_{coul}}{K_T} \quad (1)$$

where $I_m$ = motor current required to drive a single tape reel at an acceleration $\ddot{x}$ $\ddot{x}$ = desired tangential tape acceleration $K_T$ = torque constant of a permanent-magnet direct-current servomotor (torque output per current input)

$C_1, C_2$ = constants, used in calculating tape inertia $J_o$ = empty-reel inertia $R$ = radius to outer layer of tape on the reel $F_{ten}$ = desired value of tape tension $T_{visc}$ = viscous friction torque load on the motor $T_{coul}$ = coulomb (dry) friction torque load on the motor Equation (1) provides the basis for the control algorithms that drive both reels. It separates motor current $I_m$ into the following three components needed for acceleration, tensioning, and for overcoming friction or drag:

$$I_m = I_{accel} + I_{ten} + I_{drag} \quad (2)$$

where:

$$I_{accel} = \frac{\ddot{x}}{K_T}(C_1 \frac{R^4 - C_2}{R} + \frac{J_o}{R}), \quad (3)$$

$$I_{ten} = \frac{F_{ten}R}{K_T}, \text{ and} \quad (4)$$

$$I_{drag} = \frac{T_{visc} + T_{coul}}{K_T} \quad (5)$$

As in said related patent application, to control velocity of the tape, the value of $\ddot{x}$ in the $I_{accel}$ current to each motor [Equation (3)] is set proportional to tachometer period error but when the period error would be large, as in starting from rest, it is limited to a preselected maximum value. This limit is set so as to establish a preselected maximum rate of acceleration. That is, $$\ddot{x} = \frac{\ddot{x}_{max}}{e_{lim}} \cdot [n - n_{ref}] \text{ limited to } \pm e_{lim} \quad (6)$$

where $\ddot{x}_{max}$ = the maximum acceleration that will be required $n$ = the number of clock periods counted between successive lines on tachometer 17

$n_{ref}$ = the reference value of period count $n$ for exactly the desired tape velocity, $v_{ref}$ $e_{lim}$ = the preselected limit value of period error $(n - n_{ref})$ at which the acceleration reaches its maximum value.

Alternatively, to control position of the tape, set $\ddot{x}$ proportional to position error.

$$\ddot{x} = \ddot{x}_{max} \frac{(x_{ref} - x)}{e_{lim}} \quad (7)$$

where $x$ = measured position of the tape (represented by an up-down count of fine tachometer lines)

$x_{ref}$ = reference position.

The required tension current $I_{ten}$ is shown to be proportional to tape radius by Equation (4).

$I_{drag}$ is assumed to be constant at a predetermined value. As in the related patent application, the sign of this term is switched according to sensed velocity direction so that it always offsets the effects of friction on the drive; and during position control the value of $I_{drag}$ is set to zero.

The apparatus according to the present invention employs algorithms identical with or analogous to those above described in this Section (a). The apparatus according to the present invention differs from that in the aforementioned related application in the respects now to be described.

(b) Preliminary Description

As illustrated, the tape motion control system embodying the invention comprises a pair of motors 10, 11, each driving a respective reel 12, 13 of a reel-to-reel tape drive apparatus in which tape 14 normally passes from reel 12 past a read/write head 15 to reel 13. A tape motion sensor, such as a tachometer 16, emits a single pulse at completion of a relatively large preselected angle, herein illustrated as 360°; i.e., once per revolution of the shaft of reel 13. A tape motion sensor, preferably a two-phase fine tachometer 17 with a large number N of fine graduations or lines uniformly spaced circumferentially, emits N pulses during each revolution of reel 12.

Assume now that tape 14 is advanced from reel 12 in response to a conventional "move forward" command. As illustrated, the pulses from tachometer 17 are transmitted via a line 18 to, and are temporarily accumulated in, a counter 19, preferably a Programmable Logic Array. By and upon occurrence of each single pulse from tachometer 16, as transmitted via a line 20, this accumulated count is gated out from counter 19 into a line 21.

(c) Computation of Tape Reel Radii

From this gated out count $N_{12}$, drive currents for motors 10, 11 are controlled. But first the radii of tape on the reels 12, 13 must be calculated. Since the same length of tape 14 that covers one circumference of reel 13 also spans the $N_{12}$ tachometer lines counted from reel 12, which has a total of N lines on the tachometer 17, reel 12 will be rotated through $N_{12}/N$ of a revolution while reel 13 completes precisely one revolution. Thus:

$$2\pi R_{13} = (\frac{N_{12}}{N}) \cdot 2\pi R_{12}$$

with the result that $$R_{13} = R_{12} \cdot (N_{12}/N) \quad (8)$$

where $R_{12}$ is the radius of reel 12 and $R_{13}$ is the radius of reel 13.

Since the total amount of tape on the two reels will remain constant, but only its distribution will vary during transfer of tape from reel to reel, the following equation will always be true by geometry, despite changes in radii $R_{12}$ and $R_{13}$:

$$\pi(R_{12}^2 - R_i^2) + \pi(R_{13}^2 - R_i^2) = \pi(R_m^2 - R_i^2)$$

or, $$R_{12}^2 + R_{13}^2 = R_m^2 + R_i^2 \quad (9)$$

where
$R_i$ = inner radius of tape = outer radius of reel hub
$R_m$ = maximum radius of tape when all of the tape is wound on one reel only.

If the maximum possible tape radius $R_m$ is known (or is calculated in the manner hereinafter described), the right-hand side of Equation (9) sums to a constant, designated $C_{10}^2$. From this, a "radius constant" $C_{10}$ is defined as follows:

$$C_{10} = \sqrt{R_m^2 + R_i^2} \quad (10)$$

By substituting Equations (8) and (10) into (9), one radius can be found from the measured lines count, $N_{12}$.

$$R_{12} = \frac{C_{10}}{\sqrt{1 + (\frac{N_{12}}{N})^2}} \quad (11)$$

If the maximum tape radius is not known (e.g., for a series of reels holding various lengths of tape), then it can be determined by the following initialization procedure, provided the hub radii of both reels 12, 13 are known and are identical and the total number of fine lines on tachometer 17 is known.

Load tape 14 onto the drive so that all of the tape is on reel 12;
$R_{13} = R_i$, the hub radius, and
$R_{12} = R_m$, the unknown maximum radius.

Now apply small currents to each motor so that tape 14 starts to wrap on reel 13, and its tachometer 16 makes one complete revolution, resulting in a lines count $N_{12}$ on tachometer 17. From equation (8), $R_m$ (i.e., $R_{12}$) can now be found, as follows:

$$R_{13} = R_i = \frac{R_{12} N_{12}}{N} = \frac{R_m N_{12}}{N}$$

hence, $$R_{12} = R_m = \frac{R_i N}{N_{12}}$$

$C_{10}$ can now be found as was shown in Equation (10) as $$C_{10} = R_i \sqrt{(\frac{N}{N_{12}})^2 + 1} \quad (12)$$

(d) Velocity Control

Tape velocity past read/write head 15 is controlled in the novel manner now to be described.

The value of the reference count $n_{ref}$ needed in Equation (6) for calculation of acceleration during velocity control is:

$$n_{ref} = \frac{2\pi R_{12}}{NT v_{ref}} \quad (13)$$

where
$R_{12}$ = the tape radius on reel 12
$N$ = the number of lines on tachometer 17
$T$ = the time duration of one clock period
$v_{ref}$ = the reference (or desired) tape velocity By substitution of $R_{12}$ from Equation (11) into Equation (13), the value of $n_{ref}$ can be found directly from the lines count $N_{12}$ and $C_{10}$, since the values of N, T and $v_{ref}$ are fixed for any given tape transport apparatus:

$$n_{ref} = \frac{2\pi C_{10}}{NT v_{ref}} \cdot \frac{1}{\sqrt{1 + (\frac{N_{12}}{N})^2}} \quad (14)$$

From Equation (13) it will be noted that this period reference $n_{ref}$ is not a constant, but is proportional to radius $R_{12}$. (That proportionality is a consequence of the fine tachometer 17 being on the shaft of reel 12 rather than on an idler in the tape path.)

When operating in velocity mode, a mode switch 22 is set in "velocity mode" to cause pulses from fine tachometer 17 to gate a period error counter 23. Clock pulses $n$ are also supplied at a high frequency to counter 23 via a line 24. Assuming $n_{ref} = 200$ (i.e., 200 clock pulses per fine tachometer pulse), counter 23 is preset to $-200$ and incremented with each clock pulse until the count is gated out into a line 25 by a fine tachometer pulse in line 18; whereupon the counter is again reset to $-200$.

Counter 23 comprises means for obtaining the algebraic difference between $n$ and $n_{ref}$. Thus, if the $n$ clock pulse count in counter 23 equals the desired number $n_{ref}$ when gate-out occurs, then the time period to generate these clock pulses $n$ corresponds precisely to the desired time period between gating pulses, with the result that the period error count $(n - n_{ref})$ is 0. If the gating pulse occurs, for example, after 190 (or 210) clock pulses, the period error count to line 25 will be $-10$ (or $+10$).

The sign of period error count will thus be negative or positive depending upon whether the actual time period between fine tachometer pulses was shorter or longer than the desired time period. The acceleration current to reel motors 10, 11 is proportional to this period error count $(n - n_{ref})$. Maximum acceleration current is applied when the period error count $(n - n_{ref})$ exceeds a predefined fraction of the reference count $n_{ref}$. This threshold magnitude of the error count is denoted by $e_{lim}$. The period error count $(n - n_{ref})$ is fed through a limiter 26 which limits its value to this limit $e_{lim}$, during start up, for example.

The velocity overshoot during a "start" is dependent on the value of the error limit $e_{lim}$. As $e_{lim}$ is reduced, the velocity overshoot increases; or as $e_{lim}$ is increased to a larger percentage of $n_{ref}$, it requires more time for the tape to come up to speed. For the particular maximum acceleration of interest, best results have been noted when $e_{lim}$ is about 25% of $n_{ref}$, i.e., $$e_{lim} = \frac{n_{ref}}{4} \quad (15)$$

The acceleration current to each motor 10, 11 can be derived from Equation (3) with the substitution of Equations (6) and (15), as follows:

$$I_{accel\ 13} = \frac{\ddot{x}_{max}}{K_T n_{ref}/4} (C_1 \frac{R_{13}^4 - C_2}{R_{13}} + \frac{J_o}{R_{13}})(n - n_{ref})$$

and (16)

$$I_{accel\ 12} = \frac{\ddot{x}_{max}}{K_T n_{ref}/4} (C_1 \frac{R_{12}^4 - C_2}{R_{12}} + \frac{J_o}{R_{12}})(n - n_{ref})$$

For simplicity, the expressions that multiply the period error $(n - n_{ref})$ in Equation (16) are rewritten as follows:

$$R_{f13} = \frac{\ddot{x}_{max}}{K_T n_{ref}/4} (C_1 \frac{R_{13}^4 - C_2}{R_{13}} + \frac{J_o}{R_{13}}) \quad (17)$$

$$R_{f12} = \frac{\ddot{x}_{max}}{K_T n_{ref}/4} (C_1 \frac{R_{12}^4 - C_2}{R_{12}} + \frac{J_o}{R_{12}})$$

As a result, Equations (16) now become:

$$I_{accel\ 13} = R_{f13}(n - n_{ref})$$

$$I_{accel\ 12} = R_{f12}(n - n_{ref}) \quad (18)$$

The factors $R_{f13}$ and $R_{f12}$ are termed "radius factors" because they are functions of tape radius. These factors are multiplied by the period error for calculating acceleration currents.

We have found by analysis and simulation that the number of bits required to represent the lines count $N_{12}$ exceeded that required for the reference count $n_{ref}$, which in turn exceeded that required for the radii $R_{12}$ and $R_{13}$ and for the radius factors $R_{f12}$ and $R_{f13}$. Therefore, it is economical to use the most precise number $N_{12}$ in line 21 (see drawing) to look up the next-most-precise number $n_{ref}$ in a ROM table 30 which is then used to index four separate tables 31, 32, 33, 34 in ROM to fine the values of least-precise numbers $R_{12}$, $R_{13}$, $R_{f12}$ and $R_{f13}$, respectively. Note that each of these four values is also a function of the radius constant $C_{10}$. $C_{10}$ is either known or derived from $N_{12}$, and the known magnitude of $R_i$ (hub radius of reel 13) and N (total fine tachometer lines on 17), as described in Section (c) above.

Table 31 contains values of $R_{12}$ uniquely indexed by values of $n_{ref}$ in accordance with a transposition of Equation (13). Table 32 contains values of $R_{13}$ that are uniquely indexed by values of $n_{ref}$, since $R_{13}$ is also proportional to $n_{ref}$, as will be apparent by substitution of Equations (13) and (14) in Equation (8).

The values of $R_{f12}$ stored in Table 33 can be uniquely indexed by values of $n_{ref}$ because $R_{f12}$ is a function of $n_{ref}$ and $R_{12}$ [see Equation (17)], and $R_{12}$ is also a function of $n_{ref}$ [see Equation (13)].

Likewise, values of $R_{f13}$ stored in Table 34 can be uniquely indexed by values of $n_{ref}$ because $R_{f13}$ is a function of $R_{13}$ and $n_{ref}$ [see Equation (17)]; $R_{13}$ is proportional to $R_{12}$ and $N_{12}$ [see Equation (8)]; $R_{12}$ is a function of $n_{ref}$ [see Equation (13)]; and $N_{12}$ is a function of $n_{ref}$ [see Equation (14)].

It should be noted that the ROM tables 30, 31, 32, 33, 34 are precalculated from a computer program by a computation logic device 49b that calculates $R_{12}$, $R_{13}$, $R_{f12}$, $R_{f13}$, and $n_{ref}$ corresponding to all possible values of lines count $N_{12}$ using Equations (8), (10), (11), (13), and (17).

(e) Position Control ("Stop-Lock" Mode)

In this mode, tape position is monitored against drift. Mode switch 22 is set to "positioning mode," and an input line $x_{ref}$ to an up/down position-error counter 35 is set to zero to "mark" the desired position at which the tape 14 is to be maintained. Counter 35 is connected to be driven by the two-phase fine tachometer 17 via a branch of line 18, and hence is direction sensitive. If tape position drifts one way or the other enough to generate one or more fine tachometer pulses $x$, then counter 35 will provide in line 36 a position error count $(x_{ref} - x)$ of a magnitude and sign indicating magnitude and direction of drift. This error count is limited by a limiter 37 to a preselected magnitude (e.g., 20 $x$ pulses).

Thus, stop-lock control is independent of tape radius.

(f) Gap Size Control and Forward Hitch

When controlling the size of the inter-block gap (IBG) or when spacing forward before starting a deceleration cycle, it is necessary to displace tape 14 by an exact distance.

If the spacing between the N lines of fine tachometer 17 is relatively coarse, only a few such lines will be crossed as an IBG is traversed. However, the IBG must be created to the right length within tight tolerances. This can be achieved by using a combination of fine tachometer line count and clock period counts, for example as follows:

After the last byte of a block is written, clock periods $n$ are counted in counter 55 until a fine tachometer pulse is generated in line 18. This clock period count $n$ is now recorded in a register 56. Back hitch counter 57 has its value reset to zero; whereupon the counter will start up/down counting of fine tachometer lines independently of tape reel radius.

Meanwhile, counter 55 will continue to count clock periods. If a reinstruct command (i.e., to write another block) is received in time, then when the clock period count reaches a preselected number, the writing of the new block may begin. This preselected number is equivalent to the time required to traverse a standard IBG length at nominal velocity. If the reinstruct command is not received in time to continue writing, then a "back hitch" is necessary. The back hitch tachometer counter 57 will be used to arrive back at the same tachometer line after the back hitch, the motion then being at full speed forward. The clock period count $n$ in counter 55 is then preset to the number recorded in register 56. The clock period counts are counted until the preselected number is reached, at which time writing of the new block will commence.

(g) Tension Control

The apparatus according to the present invention employs the digital open-loop tension control system described in the aforementioned related patent application; viz, a tensioning torque is applied to each reel motor proportionate to the tape radii of the respective reels 12, 13.

However, a closed-loop tension control system is superimposed upon this open-loop system in order to achieve a vernier control imposing tighter restrictions on tension excursions. This tighter control is required because with high acceleration rates, the variations in inertias and torque render the above open-loop system inadequate.

As illustrated, this closed-loop system is analog (although, if preferred, digital means could be substituted effectively). A tension transducer 38 in the path of tape 14 measures the tape tension force by any suitable means; e.g., as shown, this transducer comprises an idler pulley 39 carried by a pivoted arm 40 and biased by a spring 41 into contact with tape 14. The deflection of pulley 39 and hence arm 40 is suitably sensed, as by a linear variable differential transformer (LVDT), not shown, in a manner known to those skilled in the art, to provide a value of actual tension, $Ten_{actual}$.

As illustrated, the voltage representing $Ten_{actual}$ is now subtracted by summation device 45 from a voltage representing a desired (reference) tension, $Ten_{ref}$. This results in a tension error signal, $Ten_{ref} - Ten_{actual}$, in line 46. This signal is passed through a filter 47 (lead-lag compensation network) for stability. This filtered signal is now summed differentially into power amplifiers 48a, b, as shown.

SUMMARY OF OPERATION

Before start-up, the radius constant $C_{10}$ must be calculated. This is done by first manually entering in a program logic device 49, the values of $R_i$ (hub radius of reel 13) and N (total number of fine lines on tachometer 17). Then a switch 49a is closed and the reel motors 10, 11 are energized. Upon completion of the initial wrap of tape on reel 13, constant $C_{10}$ is calculated, if not preknown; then device 49b calculates values that are stored in tables 30–34.

As tape is transferred from reel 12 to reel 13, a fine tachometer line count $N_{12}$ will be gated out into line 21 at the end of each single pulse from single pulse per revolution tachometer 16, as described in Section (b) above.

The $N_{12}$ lines count and radius constant $C_{10}$ are used to repeatedly derive a value of $n_{ref}$ proportional to the changing $N_{12}$ count which changes with radius of tape on reel 12. This value of $n_{ref}$ is then used to index ROM tables 31, 32, 33, 34 to derive digital counts corresponding to $R_{12}$, $R_{13}$, $R_{f12}$ and $R_{f13}$, respectively.

The $n_{ref}$ count is also entered in period error counter 23 which counts clock pulses until a fine tachometer pulse on line 18 gates out in the period error count $(n - n_{ref})$ into line 25. This period error count is a measure of velocity error. During acceleration from a stopped condition, the velocity error will be 100% initially; but the period error count $(n - n_{ref})$ will be limited by limiter 26 to $e_{lim}$, 25% of $n_{ref}$. A preselected maximum constant acceleration is applied until the tape velocity has increased to a point where the velocity error is less than the illustrative 25%. Thereafter, the acceleration current becomes proportional to the velocity error which will reduce in proportion to the period error count $n - n_{ref}$, becoming zero when $n = n_{ref}$. This period error count is converted by the velocity-conditioned mode switch 22 to an error signal count that is transmitted to two identical multipliers 50a, b that are connected to receive the $R_f$ outputs from ROM tables 33, 34. Multipliers 50a, b multiply the error signal count by the $R_{f12}$ and $R_{f13}$ radius factors for the respective reels 12, 13 to compute corresponding values of acceleration currents $I_{accel\ 12}$, $I_{accel\ 13}$.

An adder 51a algebraically adds values of $I_{accel\ 12}$, $I_{ten\ 12}$ from table 31 based on the then radius $R_{12}$, and $I_{drag}$ from a direction logic device 52. Device 52 receives the two-phase fine tachometer pulses, and provides a positive or negative output signal according to whether the reels 12, 13 are rotating counterclockwise or clockwise, respectively. In similar manner, adder 51b adds value of $I_{accel\ 13}$, $I_{ten\ 13}$ from table 32 based on existing radius $R_{13}$, and $I_{drag}$ from device 52.

The outputs $I_{m12}$ and $I_{m13}$ from adders 51a, b are digital manifestations of appropriate currents for the motors for reels 12 and 13, respectively. These digital manifestations are converted by respective digital-to-analog converters 53a, b to analog signals, which are fed through filters 54a, b to respective amplifiers 48a, b. These amplifiers also receive filtered analog signals from the tension summation device 45, in the manner described in Section (g), to provide appropriate values of reel motor currents to maintain acceleration rate and tape tension constant adaptively as reel radii change.

When the tape is stopped for a read or write operation, mode switch 22 is conditioned for position control as more fully described in Section (e). The error signal count will now represent position error as calculated by position error counter 35 and limited by limiter 37. This error signal count will be supplied to the multipliers 50a, b; whereupon the outputs $I_{accel}$, $I_{ten}$ and $I_{drag}$ will be added, converted, filtered and amplified in the same manner as during velocity control to control the motor currents to maintain the tape against drift.

In summary, it should again be noted that, in the apparatus according to the present invention, reference count $n_{ref}$ changes adaptively with reel radius change, and is used to maintain tape velocity constant at the head; acceleration rate is maintained constant independently of the values of reel radii; the mass of tape in the system can be calculated (if not known) using only one two-phase fine tachometer on one reel shaft and a single pulse per revolution tachometer on the other reel shaft. In contrast, the apparatus according to the aforementioned related application employed a reference count that was constant, and a fine tachometer was employed in the tape path to measure actual tape velocity at the read/write head, but with the potential for tape slippage at the tachometer and subsequent loss of control under high acceleration rates.

While the invention has been particularly shown and described with reference to a preferred embodiment thereof, it will be understood by those skilled in the art that various changes in form and detail may be made therein without departing from the spirit, scope and teaching of the invention. For example, various manipulations of the above equations may be advantageous, depending upon whether the relationships are implemented in Read Only Memory (ROM) tables, as herein illustrated, or by a microprocessor, unit logic, etc. Also, a parabolic approximation to the square root functions may be found to be sufficient. Accordingly, the apparatus and method herein disclosed are to be considered merely as illustrative and the invention is to be limited only as specified in the claims.

What is claimed is:

1. A reel-to-reel tape transport apparatus wherein an unbuffered length of tape follows a substantially fixed-length path from a supply reel past a read/write head to a take-up reel and one more motor drives the take-up reel and another motor drives the supply reel to maintain appropriate tape motion at the read/write head, characterized by:

circuit means for providing a single gating pulse each time one of the reels rotates through a relatively large preselected angle;

circuit means for providing a plurality of pulses, one each time the other of the reels rotates through another angle which is substantially smaller than said preselected angle;

counter means for counting the numbers of said plurality of pulses;

means responsive to the single pulse to gate out the count from said counter means; and means responsive to each such gated out count to provide currents to each of said motors of a magnitude corresponding to said gated out count according to a predetermined servo algorithm for controlling rotation of said reels, thereby to provide continuing changes in currents as the radii of the reels change.

2. A tape transport apparatus according to claim 1, wherein the last-introduced means provides continuing changes in reel-motor acceleration and tension currents as the radii of the reels change, and including means for providing a drag current to each motor of preselected magnitude but of a direction which varies so as always to offset the effect of friction on movement of the tape reels.

3. A tape transport apparatus according to claim 1, including means providing a digital value of a reference count that is proportional to a particular value of radius of said other reel, and wherein said digital values of reference count are derived from means responsive not only to said gated out count but also to a radius constant that is related to the maximum radius of the tape when wrapped on one of said reels.

4. A tape transport apparatus according to claim 3, including means for limiting the manifestation of a velocity error to a threshold value that is a predetermined percentage of said reference count at which the acceleration reaches its maximum, thereby to minimize overshoot without unduly delaying the tape in coming up to desired velocity.

5. A tape transport apparatus according to claim 3, including means storing digital values which correspond to predetermined magnitudes of the radius of each of said reels for controlling tension currents for each motor, and digital values which correspond to predetermined values of a radius factor for each of said reels for controlling acceleration currents for each motor, said storing means being indexed by said reference count to provide digital outputs used to calculate said tension and acceleration currents.

6. A tape transport apparatus according to claim 1, wherein the last-introduced means includes means for calculating a radius constant related to the maximum radius of the tape when wrapped on only one of the reels.

7. A tape transport apparatus according to claim 6, wherein said calculating means calculates said radius constant only once; namely, upon completion of an initial wrap of tape onto said one reel.

8. A tape transport apparatus according to claim 2, including tension sensing means comprising:

a sensing device including means contacting said unbuffered length of tape along said path for providing analog signals indicative of variations in tape tension from a reference value, and a servo system responsive to said analog signals for modifying said currents for each motor accordingly.

9. A tape transport apparatus according to claim 1, wherein each of said circuit means comprises a tachometer, one of said tachometers being of the two-phase type for indicating the direction of movement of the tape and causing an appropriate current to be applied to each motor for offsetting drag.

10. A method of controlling motion of an unbuffered length of tape as it is transferred from one reel to another reel, comprising the steps of:

employing reels having hubs of identical diameter, using a radius constant, which is related to the maximum radius of tape on said one reel at completion of an initial wrap of the tape on said other reel, in conjunction with a manifestation indicative of the changing amount of tape transferred from said one reel to said other reel during successive revolutions of said one reel to repeatedly derive values related to the respective radii of both of said reels; and converting the values as derived into manifestations corresponding to appropriate reel-motor acceleration currents for each reel according to its then existing radius.

11. The method according to claim 10, including the initial step of calculating said radius constant, if not already known, at completion of the initial wrap of the tape on said other reel.

12. The method according to claim 10, wherein said derived values are related to the radius of each reel and a radius factor for each reel, and said converting step includes the steps of:

converting the radius factors into manifestations corresponding to appropriate reel-motor acceleration currents, and converting the radius of each reel into manifestations corresponding to appropriate reel-motor tension currents; and applying a constant drag of preselected magnitude on each reel to offset the effects of friction.

13. The method according to claim 10, including the step of:

limiting velocity error to a threshold value to minimize overshoot without unduly delaying the tape in coming up to desired velocity.

14. A tape transport apparatus according to claim 1, including means for controlling the size of an interblock gap between blocks of data on the tape, said means comprising:

first counter means operative after the last byte of a block of data is written on the tape, for counting a series of clock period pulses until the next one of said plurality of pulses is generated, register means operatively responsive to said next pulse for storing the then existing count of said clock period pulses, second counter means reset to a reference count responsively to said next pulse and then operative to count said plurality of pulses up or down relative to said reference count according to the direction of rotation of the reel, independently of reel radius; and means responsive to receipt of a reinstruct command before the inter-block gap is traversed, for initiating writing of a new block of data on the tape when the number of clock period pulses in said first counter means reaches a preselected number corresponding to the time required to traverse the inter-block gap at normal velocity.

15. A tape transport apparatus according to claim 14, comprising:

means responsive to the absence of a reinstruct command before the inter-block gap is traversed for moving the tape backward to perform a "back hitch" operation, and then moving the tape forward to a position corresponding to that at which said second counter means was previously reset;

means for presetting the clock period pulse count previously stored in said register in said first counter means; and means for initiating writing of a new block of data on the tape when the number of clock period pulses as counted by said first counter means attains said preselected number.

16. Method for controlling the size of an inter-block gap between blocks of data on a magnetic tape, comprising the steps of counting in a first counter, after the last byte of a block of data is written on the tape, a series of clock period pulses until a tachometer pulse is generated by rotation of a tape reel through a preselected small angle;

upon occurrence of said tachometer pulse, storing the number of said clock period pulses in a register and simultaneously resetting a second counter to a reference count;

counting tachometer pulses in said second counter, up or down relative to said reference count according to the direction of rotation of the reel, independently of reel radius;

continually counting clock period pulses in said first counter; and initiating writing of a new block of data on the tape when the number of clock period pulses reaches a preselected number corresponding to the time required to traverse the inter-block gap at normal velocity, if a reinstruct command is received before the inter-block gap is traversed.

17. The method according to claim 16, comprising the further steps of moving the tape backward to perform a "back hitch" operation if a reinstruct command is not received before the inter-block gap is traversed; then moving the tape forward to a position corresponding to that at which said second counter was previously reset;

presetting in said first counter the clock period pulse count previously stored in said register, and then counting clock period pulses, and initiating writing of a new block of data on the tape when the number of clock period pulses reaches said preselected number.

* * * * *